United States Patent [19]

Spence

[11] 4,451,380
[45] May 29, 1984

[54] WASTE DISPOSAL

[76] Inventor: Derek W. Spence, 1 Saltaire Rd., Eldwick, Bingley, West Yorkshire, England

[21] Appl. No.: 327,224

[22] Filed: Dec. 3, 1981

[30] Foreign Application Priority Data

Dec. 6, 1980 [GB] United Kingdom ............... 8039183

[51] Int. Cl.³ ............................................. B01D 21/24
[52] U.S. Cl. .................... 210/739; 210/745; 210/800; 210/96.1; 210/112; 210/143; 8/139; 8/158; 68/18 R
[58] Field of Search ................... 8/139, 158; 68/18 R; 210/739, 745, 800, 96.1, 104, 109, 110, 112, 115, 134, 135, 142, 143, 333.1, 333.01, 86, 93, 806

[56] References Cited

U.S. PATENT DOCUMENTS

| | | | |
|---|---|---|---|
| 2,628,194 | 2/1953 | Gilwood | 210/96.1 |
| 3,128,786 | 4/1964 | Badgett | 210/96.1 |
| 3,208,592 | 9/1965 | Smith | 210/96.1 |
| 3,300,405 | 1/1967 | Black | 68/18 R |
| 3,499,533 | 3/1970 | Lopker | 210/143 |
| 3,777,127 | 12/1973 | Goetchius | 68/18 R |
| 3,831,755 | 8/1974 | Goodman | 210/333.1 |
| 3,920,550 | 11/1975 | Farrell | 210/96.1 |
| 4,116,832 | 9/1978 | Tardivel | 210/745 |
| 4,168,143 | 9/1979 | Wood | 8/139 |
| 4,261,836 | 4/1981 | Koglin | 210/739 |

FOREIGN PATENT DOCUMENTS

| | | | |
|---|---|---|---|
| 877009 | 9/1961 | United Kingdom | 210/745 |
| 1433378 | 4/1976 | United Kingdom | |
| 431889 | 7/1975 | U.S.S.R. | 210/96.1 |
| 742393 | 6/1980 | U.S.S.R. | 210/96.1 |

Primary Examiner—Ernest G. Therkorn
Attorney, Agent, or Firm—Charles A. Blank

[57] ABSTRACT

An apparatus for separating heavy solids from an effluent, for example wool scouring effluent, comprising a tank having a solids discharge outlet at its base and an ultra-sonic sensor located at a predetermined distance from this outlet. Means responsive to the output of the sensor, for example a solonoid controled valve, are provided for opening the discharge outlet when the solids concentration exceeds the preset limit. Preferably, a secondary settlement tank immediately below and directly communicating with the main tank is provided and the discharge outlet, controlled by a suitable valve, is at the base of the secondary tank. The secondary tank has a zone offset from the main solid flow in which the sensor may be located in order that large aggregates of solids do not lead to spurious operation of the sensor.

9 Claims, 3 Drawing Figures

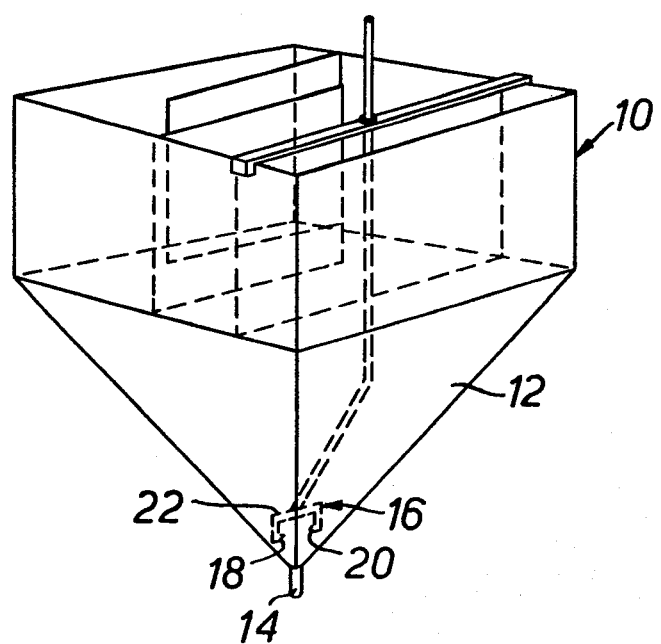

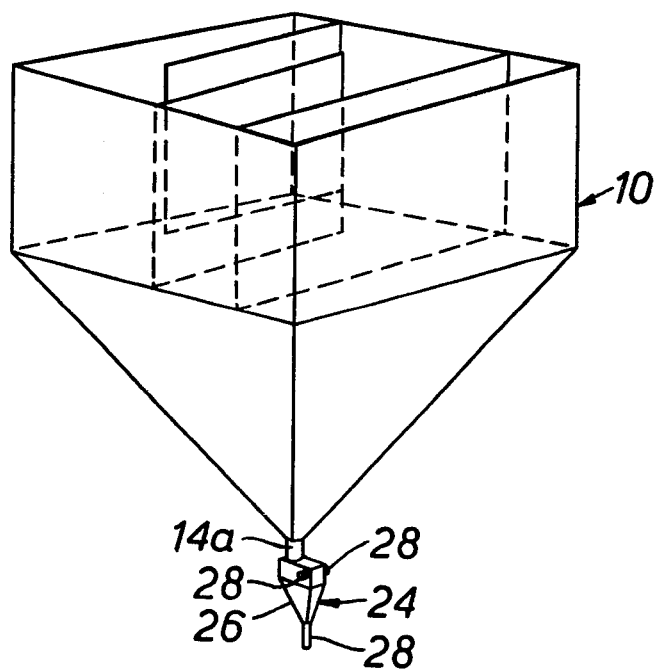

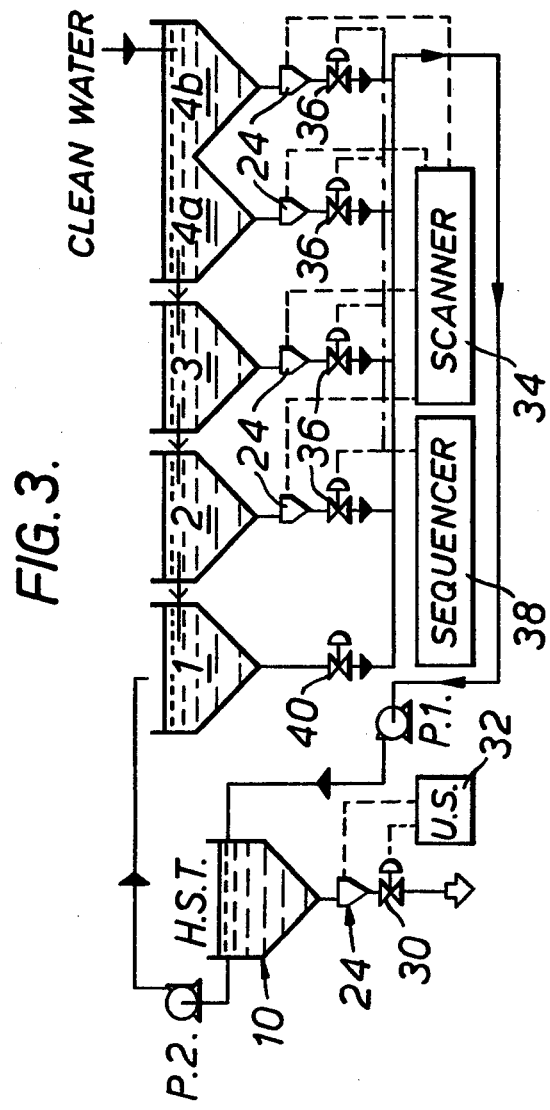

WASTE DISPOSAL

This invention relates to waste disposal and in particular relates to the separation and selective disposal of solid waste from liquid effluent.

Before animal fibres such as wool can be processed they need to be cleaned, or scoured, of contaminants picked up while on the animal.

For example, a wool fleece removed from an Australian Merino sheep can easily contain, for each kilogram of clean dry wool, half a kilogram of contamination, comprising dirt, dust, sand, salts of perspiration (called suint) and a heavy coating of grease. This contamination is generally removed by aqueous scouring in baths containing soap and soda solution, or dilute detergent solution.

Clearly, the scouring of large quantities of wool, for example in a commercial scour train, will produce large quantities of heavily polluted aqueous effluent. At one time such effluent was merely discharged to drain but stricter environmental controls and effluent charges make this simple expedient no longer practical.

Systems have been developed, based on recycling of wash liquors (see for example U.S. Pat. No. 4,168,143 and G.B. Pat. No. 1,433,378) which involve considerably smaller discharge of effluent, and hence considerably lower effluent charges. Such systems generally provide for the separation and collection of the wool grease, in itself a valuable by-product, and the removal of heavy solids from the wash liquor before recycling the latter into the scouring bowls.

One way of removing heavy solids from scour effluents involves the use of a heavy solids settling tank. The latter is a tank of relatively large volume in relation to the total volume of the liquid employed in the scour system, into which the most contaminated scour liquor is pumped. Owing to the tank's large volume, the residence time of liquor in the tank is relatively long giving time for the heavy solids in the liquor to fall towards the bottom of the tank, which is funnel shaped so as to concentrate the solids at an outlet point, and to allow the wool grease to float to the surface. Liquor from the relatively clean centre portion can then be withdrawn from the tank for further processing or recycling into the scour bowls. Heavy solids may also be removed from some or all of the scour bowls.

It has previously been the practice in such heavy solid settling tanks to open the solids discharge outlet so as to allow settled heavy solids to be discharged on a time basis, the timer being set so as to prevent build-up of solids even when the scour train is treating the most heavily contaminated wool. Accordingly, in normal operation, such timed openings of the solids discharge outlet allow far too much scour liquor to be discharged. Furthermore, such timed operation tends to produce excessive discharge of grease, and if the discharge circuit is left to function during the time when no wool is being scoured, the timer may well discharge the whole contents of the tank involving the loss of detergent, dissolved salts, and any wool grease on the surface of the tank.

The invention seeks to provide a method of controlling discharge of heavy solids from a heavy solids settling tank in an effluent treating system which is free from the above mentioned defects.

According to the present invention there is provided a method of controlling the discharge of solids from a tank which comprises locating an ultrasonic sensor at a predetermined distance from the solids discharge outlet of the tank, adjusting the sensor to sense a preset concentration of solids in the effluent, and, responsive to the output of the sensor, opening the discharge outlet when the solids concentration exceeds the preset limit.

The invention further provides an apparatus for separating heavy solids from an effluent which comprises a tank having a solids discharge outlet at its base, an ultrasonic sensor located at a predetermined distance from the outlet, and means responsive to the output of the sensor for opening the discharge outlet when the solids concentration exceeds the preset limit.

We have found that, in order to prevent spurious operation of the sensor owing to large aggregates of solids which are occasionally present in the scour liquor, it is desirable to locate the sensor in such a manner that it is shielded from such aggregates falling from above. One preferred way in which this may be accomplished is to provide a secondary settlement tank immediately below and directly communicating with the main tank, the discharge outlet, controlled by a suitable valve means, being at the base of the secondary tank, and the secondary tank having a zone off-set from the main solids flow in which the sensor may be located.

The ultra-sonic sensor employed may be one of those available commercially for sensing concentrations of solids in liquid medium, and in general may comprise two units, separated by a given distance or gap, one of which generates an ultra-sonic signal, and the other of which detects it. Attenuation of the signal between the transmitter and receiver is proportional to the concentration of solids in the gap between the two and by adjusting the gap the concentration at which cut off occurs may be preset. The transmitter and receiver unit of the sensor may be mounted on a common rigid member, or may be fitted into opposed walls of the tank having the correct separation.

The invention will be described further, by way of example, with reference to the accompanying drawings, in which:

FIG. 1 is a diagrammatic view of an apparatus according to the invention;

FIG. 2 is a similar view to FIG. 1 of a preferred embodiment of the invention; and FIG. 3 illustrates diagrammatically a wool scour system embodying the invention.

Referring firstly to FIG. 1, there is shown a heavy solids settlement tank 10 of a wool scouring system heavily contaminated with scouring effluent from the scour train (typically containing 6 to 7% total solids by weight) is pumped into this tank where much of the grease floats to the surface, and the heavy solids fall. The sloping sides 12 of the tank direct the heavy solids towards a discharge outlet 14 located in the base of the tank which may be opened and closed by the valve means (not shown). An ultra-sonic sensor 16, which comprises a transmitter unit 18 and receiving unit 20 mounted on a rigid member 22 maintaining a predetermined gap between the transmitter and receiver, is located at a predetermined distance from the discharge outlet.

The manner in which the latter distance is determined depends on the attenuating properties of the solids to be detected and the characteristics of the ultra-sonic control. The heavy solids sludge which forms at the bottom of the tank in a wool scouring system, such as the tank 10, typically has a solids content of greater than 15% by weight. The characteristics of most ultra-sonic sensors that are commercially available are such that they would be triggered by concentrations of solids much lower than this figure. Since a concentration gradient exists within the tank, in normal operation, with the heaviest concentration at the bottom, it is possible to determine in any given situation the level above the discharge outlet at which the concentration is within the range which would trigger the sensor when a desired build-up of sludge has been achieved about the discharge outlet 14. Placing the sensor higher than this would result in too great a build-up of sludge about the outlet 14. Since the sludge can, if not discharged regularly, solidify and block the outlet, this state of affairs is to be avoided. Placing the sensor below this optimum level would tend to cause the outlet to be opened to often thereby discharging and wasting excessive quantities of liquid.

In operation, as the sludge builds up about the outlet discharge 14, to the point where the sensor 16 is triggered, then the sensor actuates the discharge control valve (not shown) to allow the sludge to be discharged from tank 10. The opening of the valve may be delayed for a short pre-determined period by a simple timing device, but the valve is closed immediately the concentration as sensed by the sensor 16 falls below the preset limit so that the minimum amount of liquor is discharged.

The device as described in FIG. 1 in general operates satisfactorily but suffers from certain disadvantages. For example, the sensor may be triggered by lumps or aggregates of solids falling between the units 18 and 20, it may become fouled with wool fibres which are always present in scour liquor, and on inserting the sensor into the tank, it must pass through the surface grease layer, which again causes contamination of the units 18 and 20 rendering operation of the sensor unreliable until the grease has been removed by the scouring action of the liquor.

An improved form of the apparatus is shown in FIG. 2. In this, the tank 10 is similar to that used in the apparatus of FIG. 1, but its outlet discharge pipe 14a is of larger diameter than the discharge 14 in FIG. 1, and the pipe 14a communicates directly with a secondary tank or chamber 24 which is very much smaller than the tank 10. The chamber 24 also has conical sides 26 which slope to a discharge outlet 28 which is of the same diameter as the normal discharge outlet (such as that indicated at 14 in FIG. 1), and is controlled, as before, by valve means (not shown in FIG. 2). The chamber 24 has, set flush in its internal walls, ultra-sonic transmitter and receiver units 28 together comprising an ultra-sonic sensor 16, with the separation of the chamber wall giving the gap between the units 28. The entry of the pipe 14a into the chamber 24 is off-set so that the flow of effluent through the sample chamber 24 avoids the gap between the two units thus preventing any aggregated solids falling from the tank 10 causing spurious operation of the sensor 16. The sludge of heavy solids builds up in this case in the bottom of the chamber 24 about the discharge outlet 28 and when the concentration sensed by the sensor 16 reaches the predetermined limit, the valve means is actuated to discharge the sludge as before.

If wool scouring is interrupted for any length of time, no fresh contaminated liquor is pumped into the tank 10. Consequently, the liquor already resident in the tank tends to settle out causing a build-up of sludge about the discharge and a corresponding diminution of the concentration of solids above the discharge outlet. Thus, in the case of the apparatus of FIG. 1, the sensor, "seeing" a lower concentration, would not activate the discharge control valve whereas in fact the sludge under these conditions is building up. Such sludge, if left for any length of time, can solidify so that when the scouring is recommenced and the discharge valve actuated, a solid plug of solidified sludge can block the outlet. However, in the apparatus of FIG. 2, the volume of the sample chamber is small enough, in the order of five litres, so that even if sludge builds up to the level of the sensors 28, the pressure of the liquor in the tank 10 is sufficient to dislodge it; and of course, once the sludge has built up to the level of the sensor 28, the discharge valve will be actuated, even if scouring is not taking place at this point.

As an alternative to the chamber 24 forming a separate tank below the main settling tank 10, a sheltered zone could be formed within the main tank 10, to house the sensor 16. However, for reasons of cost and convenience it is usually preferable to employ a separate chamber such as the chamber 24.

While the invention has been described above with reference to wool scouring effluent it will be appreciated that it is not so-limited; and in general will find application in any situation where it is desired to separate and selectively remove the solids component from a solids-containing liquid. Other applications in the effluent treatment field include sewage treatment and lime slurry separation. The exact parameters chosen for different end-uses, e.g. the gap between the sensor units and distance of the sensor from the outlet, will of course vary according to the nature of the medium employed since different solids particle size, shape and other characteristics, will affect these parameters. However the optimum value of the parameters if easily determined empirically in any particular use by one skilled in the art.

Furthermore, when used on connection with wool scouring apparatus, the device of the invention may be located in association with the heavy solids settling tank and/or in association with one or more of the scouring bowls. This is illustrated in FIG. 3.

Referring now to FIG. 3, a four bowl wool scouring system employing a heavy solids settling tank is shown schematically. The heavy solids settling tank 10 is provided with a secondary chamber 24 as described with reference to FIG. 2. A discharge valve 30, actuated by a solenoid under the control of an ultra-sonic control unit 32 connected to the ultra-sonic sensor units controls the discharge of solids sludge from the tank. In addition, further chambers 24 are located beneath each of the scouring bowls other than the first. In each case the ultra-sonic sensors within the chambers 24 are connected to a scanner 34 and the respective discharge valves 36 have their solonoids connected to a sequencer 38.

The scanner 34, sequencer 38 and ultra-sonic control unit 32 are interconnected and operate as follows. The scanner 34 connects the ultra-sonic control unit to the ultra-sonic sensors in each of the chambers 24 in sequence. Should one of the sensors have been triggered by the concentration within its respective bowl or tank, the scanning sequence is halted and a signal sent via the sequencer 38 to operate the valve 36 and discharge the solids. After this the scanning proceeds again until another chamber 24 "calls" for discharge. Bowl 1, containing the dirtiest wool and liquor, and hence the heaviest concentration of solids, may be connected into the circuit in such a manner that its discharge valve 40 remains open while the other discharge valves 30 and 36 are closed, and closes when any of the other discharge valves are open. By this means, using sequencer and scanner, one ultra-sonic control unit may be used to control a plurality of chambers 24 instead of requiring a separate ultra-sonic control unit associated with each chamber 24.

If desired, the scanner and sequencer may be programmed so as to give more frequent scanning and priority of discharge to those bowls most likely to have the heaviest concentration of solids.

I claim:

1. An apparatus for separating heavy solids from an effluent which comprises a tank and a solids discharge outlet communicating therewith, an ultra-sonic sensor located at a predetermined distance from the outlet, and means responsive to the output of the sensor for opening the discharge outlet when the solids concentration exceeds a present limit, the sensor being shielded from aggregates of solids falling through the effluent.

2. An apparatus as claimed in claim 1 in which a secondary settlement tank is provided immediately below and directly communicating with the first-mentioned tank and having a discharge outlet, valve means is provided at the base of the secondary tank controlling the discharge outlet of the secondary tank, and the secondary tank has a zone offset from the main solids flow in which the sensor may be located.

3. An apparatus as claimed in claim 2 in which the ultra-sonic sensor comprises two units, separated by a given distance, one of which generates an ultra-sonic signal, and the other of which detects it.

4. An apparatus as claimed in claim 3 in which the generator and detector units of the sensor are fitted into opposed walls of the offset zone of the secondary tank.

5. An apparatus as claimed in claim 1 in which the tank is a heavy solids settling tank.

6. An apparatus as claimed in claim 1 in which the tank is a wool scour bowl.

7. An apparatus as claimed in any one of claims 1 to 6 in which more than one tank and associated sensor are present, and each sensor is controlled by a single ultra-sonic control unit which is caused to scan each sensor in sequence.

8. A method of controlling the discharge of solids from a tank and a solids discharge outlet communicating therewith which comprises locating an ultra-sonic sensor at a predetermined distance from the solids discharge outlet in a position shielded from aggregates of solids falling through the effluent, adjusting the sensor to sense a preset concentration of solids in the effluent, and, responsive to the output of the sensor, opening the discharge outlet when the solids concentration exceeds a preset limit.

9. A method as claimed in claim 8 in which there is more than one tank and associated sensor, the sensors being controlled by a single ultrasonic control unit which is caused to scan each sensor in sequence.

* * * * *